(12) United States Patent
Onaga

(10) Patent No.: US 7,229,176 B2
(45) Date of Patent: Jun. 12, 2007

(54) DEVICE FOR DISPLAYING IMAGERY THREE-DIMENSIONALLY

(75) Inventor: Yutaka Onaga, Tokyo (JP)

(73) Assignee: if Co., Ltd., Tokyo (JP)

( * ) Notice: Subject to any disclaimer, the term of this patent is extended or adjusted under 35 U.S.C. 154(b) by 233 days.

(21) Appl. No.: 10/895,294

(22) Filed: Jul. 21, 2004

(65) Prior Publication Data

US 2005/0151938 A1 Jul. 14, 2005

(30) Foreign Application Priority Data

Jan. 13, 2004 (JP) ............................. 2004-005036

(51) Int. Cl.
*G03B 21/10* (2006.01)
*G03B 21/28* (2006.01)
*G02B 27/24* (2006.01)

(52) U.S. Cl. ............................. 353/10; 353/94; 359/478
(58) Field of Classification Search ............. 353/7–10, 353/94; 348/51, 52, 54; 359/475, 477–479; *G02B 27/24*
See application file for complete search history.

(56) References Cited

U.S. PATENT DOCUMENTS

| | | | | |
|---|---|---|---|---|
| 3,792,914 A | * | 2/1974 | Elias | ......................... 359/449 |
| 5,500,747 A | * | 3/1996 | Tanide et al. | ................... 349/5 |
| 6,327,020 B1 | * | 12/2001 | Iwata | ........................... 352/69 |
| 6,333,826 B1 | * | 12/2001 | Charles | ...................... 359/725 |
| 6,644,816 B1 | * | 11/2003 | Perra et al. | ................. 353/119 |
| 2003/0086167 A1 | * | 5/2003 | Sonehara | .................... 359/471 |
| 2004/0027450 A1 | * | 2/2004 | Yoshino | ...................... 348/42 |

* cited by examiner

*Primary Examiner*—W. B. Perkey
*Assistant Examiner*—Andrew Sever
(74) *Attorney, Agent, or Firm*—Snider & Associates; Ronald R. Snider

(57) ABSTRACT

Device for displaying imagery three-dimensionally, which comprises a first image reproduction element having an image reproduction surface and a second image reproduction element having an image indication surface of reflective property. Those image reproduction and indication surfaces are in an opposedly facing relation with each other, such that an imagery reproduced and indicated on the image reproduction surface is reflected by the image indicating surface to form a reflected imagery which is viewed by the eyes of person as if it was a three-dimensional image. One or both of such image reproduction and indication surfaces may be curved to have convex and concave surface sides, wherein the concave surface side is formed to have diffuse reflective property. The convex surface sides respective of those two surfaces may be in an opposedly facing relation with each other. Preferably, such two surfaces may each be a screen of light-transmissive type.

20 Claims, 13 Drawing Sheets

DEVICE FOR DISPLAYING IMAGERY THREE-DIMENSIONALLY

CROSS-REFERENCE

This application claims the priority of Japanese Patent Application No.2004-005036, filed on Jan. 13, 2004, which is incorporated herein by reference in its entirety.

BACKGROUND OF THE INVENTION

1. Field of the Invention

The present invention relates to a device for displaying or indicating an imagery three-dimensionally, so that the indicated imagery is viewed in the eyes of a person looking thereat as if it was a three-dimensional imagery.

2. Description of Prior Art

Many researches and developments have been made to produce an effective display device for displaying a three-dimensional imagery, with a plenty of various three-dimensional display devices having been made available on the market. Among them, there has been known a spherical three-dimensional display device which optically projects an imagery (or image) to a spherical screen to thereby display an imagery three-dimensionally on a spherical surface of the screen. This kind of spherical three-dimensional display device is frequently used for visual simulation of earth or natural environmental changes and symptoms. Typical examples thereof are "Gaia Vision" and "Geo Cosmos", which are each well known in Japan as a name of spherical three-dimensional display device. The "Gaia Vision" display device is found in the Japanese public facility "Center For Environmental Science in Saitama" (i.e. "Saitama-Ken Kankyou Kagaku Kokusai Center" in Japanese) located in Saitama-ken, Japan, whereas the "Geo Cosmos" display device is found in the Japanese public facility "National Museum of Emerging Science and Innovation" (i.e. "Nihon Kagaku Mirai Kan" in Japanese) located in Tokyo, Japan.

Naturally, in those public facilities, a capability for indicating precise image information is required in the spherical three-dimensional display device to meet specific requirements specialized in this technical filed. For that reason, it is necessary to provide various precision electronic and mechanical elements in order to form an optimal display device of this kind, wherein the precision electronic and mechanical parts include a precisely formed dome screen, a video projector with fish-eye lens specifically designed and produced for projecting an imagery to a spherical surface, an extraordinary large number of LED indicators, complicated system programs, and so forth. Further, installation of those constituent elements to provide a desired mode of display device requires an extremely high precision in determining positions and angles of the associated elements with one another, and also requires maintenance for each of the elements.

Consequently, while featuring the three-dimensional vision in contrast to two-dimensional vision, a multimillion or billion amount of expenses, or a multibillion amount of expenses depending on the kind of required equipments, have been incurred for installing the foregoing spherical three-dimensional display device. This has raised a serious problem in equipment expenses and costs.

In addition, in order to indicate a precise imagery or image on the entire spherical surface of dome screen of the spherical display device, it is necessary to effect complete corrections for aberration, and therefore, it is essential to provide a video projector with a fish-eye lens having a curvature equal to that of the dome screen and to precisely install that video projector at a given position and at a given angle with respect to the dome screen. Apparently, a high technical expertise and precision work have been required for that purpose, thus unfavorably raising an extreme difficulty in design and production of the video projector.

In place of such video projector arrangement, it may be proposed to assemble a great number of special LED indicator plates together into a dome configuration so as to provide a desired spherical display device. But, in such case, it is necessary to design and custom-build each of the special LED indicator plates, and further, in assembly, workers must carefully put together those LED indicator plates with precision into a desired dome shape, which results in an unexpected high increase of costs involved.

In view of the foregoing circumstances, the hitherto spherical three-dimensional display devices have encountered the problem that they require quite a lot of specially designed parts and equipments as well as high costs, thereby making it difficult to reduce them to a widespread practice in general. Moreover, most of the conventional spherical three-dimensional display devices have been mainly used for displaying a spherical image of the earth and effecting an imaginary simulation of cloud flow over the earth, and therefore, none of the spherical display devices has been developed for other uses than those geographical and geo-scientific purposes.

SUMMARY OF THE INVENTION

With the above-stated conventional art drawbacks in view, it is therefore a purpose of the present invention to provide an improved and versatile device for displaying imagery three-dimensionally, which permits its use for a variety of fields, with reduced costs in its assembly, and eliminates the necessity for providing a number of other special elements, In order to achieve such purpose, the device for displaying imagery three-dimensionally, in accordance with the present, is basically comprised of:

a first image reproduction means capable of reproducing and indicating a first imagery, said first image reproduction means including an image reproduction surface for allowing said first imagery to be indicated thereon; and a second image reproduction means capable of reproducing and indicating a second imagery, said second image reproduction means including an image indication surface for allowing said second imagery to be indicated thereon;

wherein said first and second image reproduction means are arranged such that said image reproduction surface of said first image reproduction means is an opposedly facing relation with said image indication surface of said second image reproduction means, and wherein said image indication surface includes a reflective surface capable of reflecting said first image reproduced and indicated from the said first image reproduction means.

In a first aspect of the present invention, the image reproduction surface may be curved so as to have a convex surface side, whereas said image indication surface is also curved so as to have a convex surface side, and wherein said convex surface sides respectively of said image reproduction and indication surfaces are in an opposedly facing relation with each other.

In a second aspect of the invention, the image reproduction surface may be curved so as to have a convex surface side and a concave surface side, whereas said image indication surface is also curved and has a convex surface side and a concave surface side, such that said convex surface side of said image reproduction surface is in an oppositely facing relation with said concave surface side of said image indication surface.

In a third aspect of the invention, said image reproduction surface may be formed flat, and said image indication surface be curved.

In a fourth aspect of the invention, said image reproduction surface may include a non-reflective surface portion capable of preventing said second imagery from being reflected thereby.

In a fifth aspect of the invention, said first and second image reproduction means may each comprise one selected from the group consisting of a liquid crystal display device and an organic EL display device.

In a sixth aspect of the invention, said image reproduction surface may be disposed at a point above said image indication surface.

In a seventh aspect of the invention, a light shielding means may be provided about a periphery of said image reproduction surface.

In a eight aspect of the invention, said image reproduction surface and said indication surface may each be of a semispherical shape, or one of said image reproduction and indication surfaces is of a semispherical shape.

In a ninth aspect of the invention, said second image reproduction means may include a plurality of said image indication surfaces with respect to said image reproduction surface of said first image reproduction means, or said first image reproduction means may include a plurality of said image reproduction surfaces with respect to a plurality of said image indication surface of said second image reproduction means.

In a tenth aspect of the invention, said first image reproduction means may comprise: a first screen of a light-transmissive type which forms said image reproduction surface; and a first projection means for projecting said first imagery to said first screen, wherein said second image reproduction means comprises: a second screen of a light-transmissive type which forms said image indication surface; and a second projection means for projecting said second imagery to said second screen, and wherein said second screen includes a surface so formed as to diffusely reflect said second imagery projected from said second projection means.

In an eleventh aspect of the invention, a projection means may be arranged such that one image is projected from the projection means to each of said image reproduction surface and said image indication surface.

In twelfth aspect of the invention, each or one of said first and second projection means may each include a fish-eye lens provided therein.

Other various features and advantages will become apparent from reading of the descriptions hereinafter, with reference to the annexed drawings.

DETAILED DESCRIPTION OF PREFERRED EMBODIMENTS OF THE INVENTION

Figure 1:
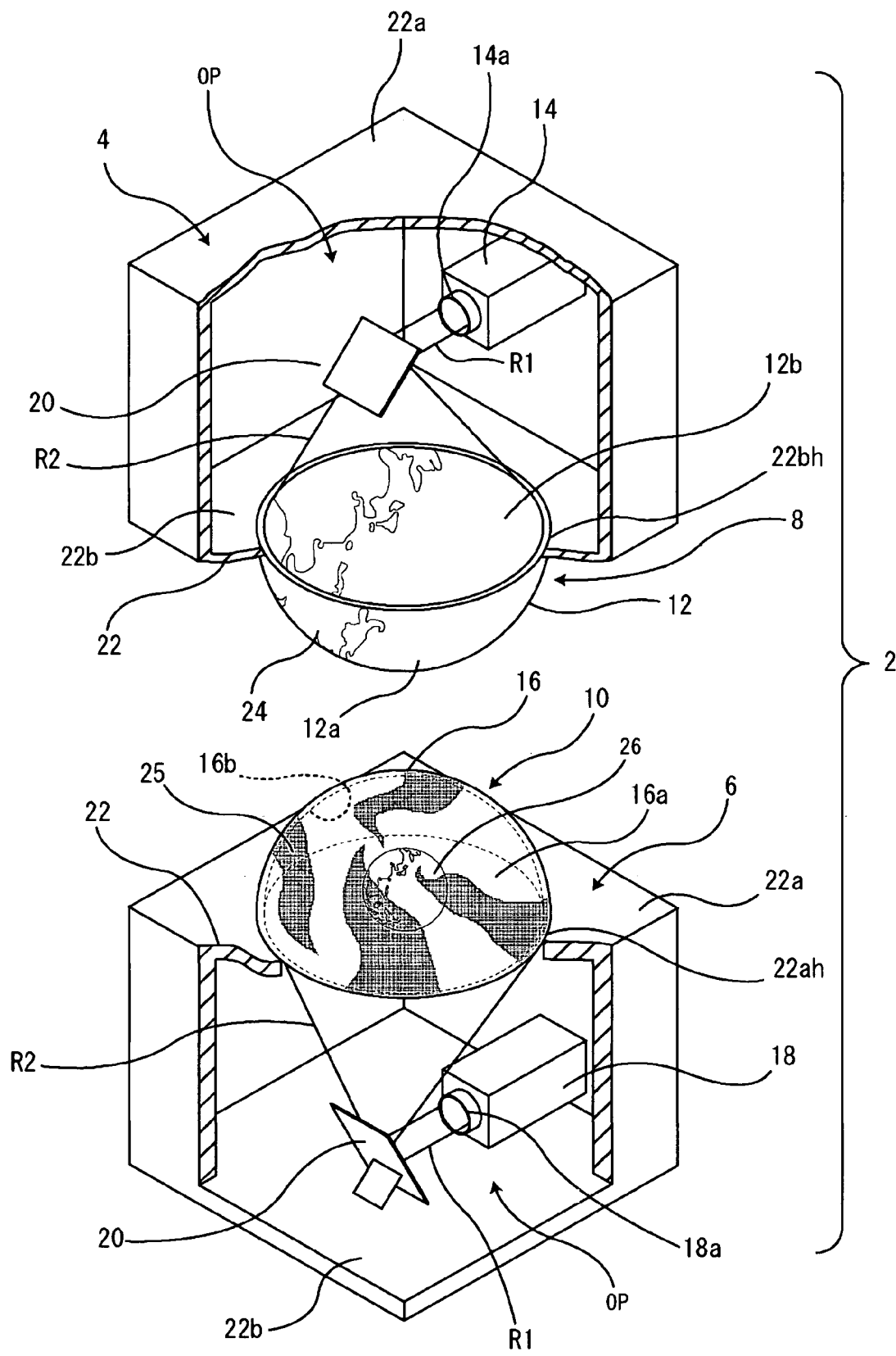
FIG. 1 is a partly broken schematic perspective view showing a first exemplary embodiment of three-dimensional display device.

Referring to FIGS. 1 through 13, there are illustrated preferred exemplary modes of device for displaying imagery three-dimensionally, generally designated by 2, in accordance with the present invention. At first, it should be noted that the illustrated various modes of such three-dimensional display device 2 are intended to show exemplary non-distinctive alternatives that can be contemplated within the scopes and gist of the present invention and therefore they are not limitative. Hereinafter, the device for displaying imagery three-dimensionally will be referred to as "three-dimensional display device" for the sake of simplicity.

Generically stated, the three-dimensional display device 2 is comprised of a first image reproduction unit 4 and a second image reproduction unit 6, wherein those two image reproduction units 4 and 6 are each operable for reproducing an imagery or image therein. While not shown, it should be understood that each of the first and second image reproduction units 4 and 6 may include an image output device operable for outputting image data thereto. Such image output device may be a suitable instrument and appliance as well as a combination of plurality of operative elements, including the state-of-art devices, which can properly operate to output image data to each of the first and second image reproduction units 4 and 6. Typical examples thereof are video devices and personal computers available on markets. Further, the image output device may include various ranges of communication arrangements wherein the imagery or image (s), and/or the corresponding image data, are transmitted via electric wave, cable, or the like, from a transmitter to a recipient who outputs those image or image data to the first and second image reproduction units 4 and 6. But, such image output device usable in the present invention is not limited to specific devices, but may include all other ranges of devices adaptable for outputting the images or various image data to both first and second image reproduction units 4 and 6. In that sense, the category of image output device or system indeed covers the afore-said transmitter who transmits the image or image data, the electric wave or cable, various devices for receiving the transmitted image or image data, and the like.

In this context, the illustrated images 24 and 25 in the drawings are a graphical image showing a part of world map or earth, by way of example, It is noted that the terminology, "imagery" or "image" (at 24 and 25), is defined hereby to include all various kinds of images that can be perceived visually by the eyes of person or observer (at 34 in FIG. 13) through the three-dimensional display device 2 of the present invention. Hence, the imagery or image may generally refer to any ordinary mode of optically created images, including still images, moving images, and the combination of the still and moving images, and also may refer to still and moving images created by laser ray or any other special optical arrangement of light and shade.

It is noted at first that the terminology, "image reproduction unit" (at 4 or 6), includes all kinds of means and devices which are capable of reproducing and indicating the imagery or images (24 and 25). While some illustrative embodiments of the image reproduction unit will be elaborated later, it is to be understood that the structure and arrangement of the image reproduction unit are not particularly limited to those embodiments. For example, instead of the illustrated embodiments to be described, the two separate image reproduction units 4 and 6 may be constructed as a single image reproduction unit, or may be formed by a plurality of various required elements into any intricate image reproduction system. Also, the image reproduction unit be embodied by one integral part of the image output device stated above.

Before describing each of the illustrated embodiments, a description will be made of generic structural concept of the present invention. Namely, stated in a generic way, the first image reproduction unit 4 has an image reproduction surface, generically designated by 8, on which a first imagery or image 24 is reproduced and indicated, whereas the second image reproduction unit 6 has an image indication surface, generically designated by 10, on which a second imagery or image 25 is reproduced and indicated. In this respect, for the sake of simplicity, the wording, "first image 24" and "second image 25", will be used hereinafter, but the first and second images 24 and 25 may refer to one and the same image, two different images, or a plurality of same or different images, according to required design and specifications, and therefore they are not limited to particular images.

Figure 10:
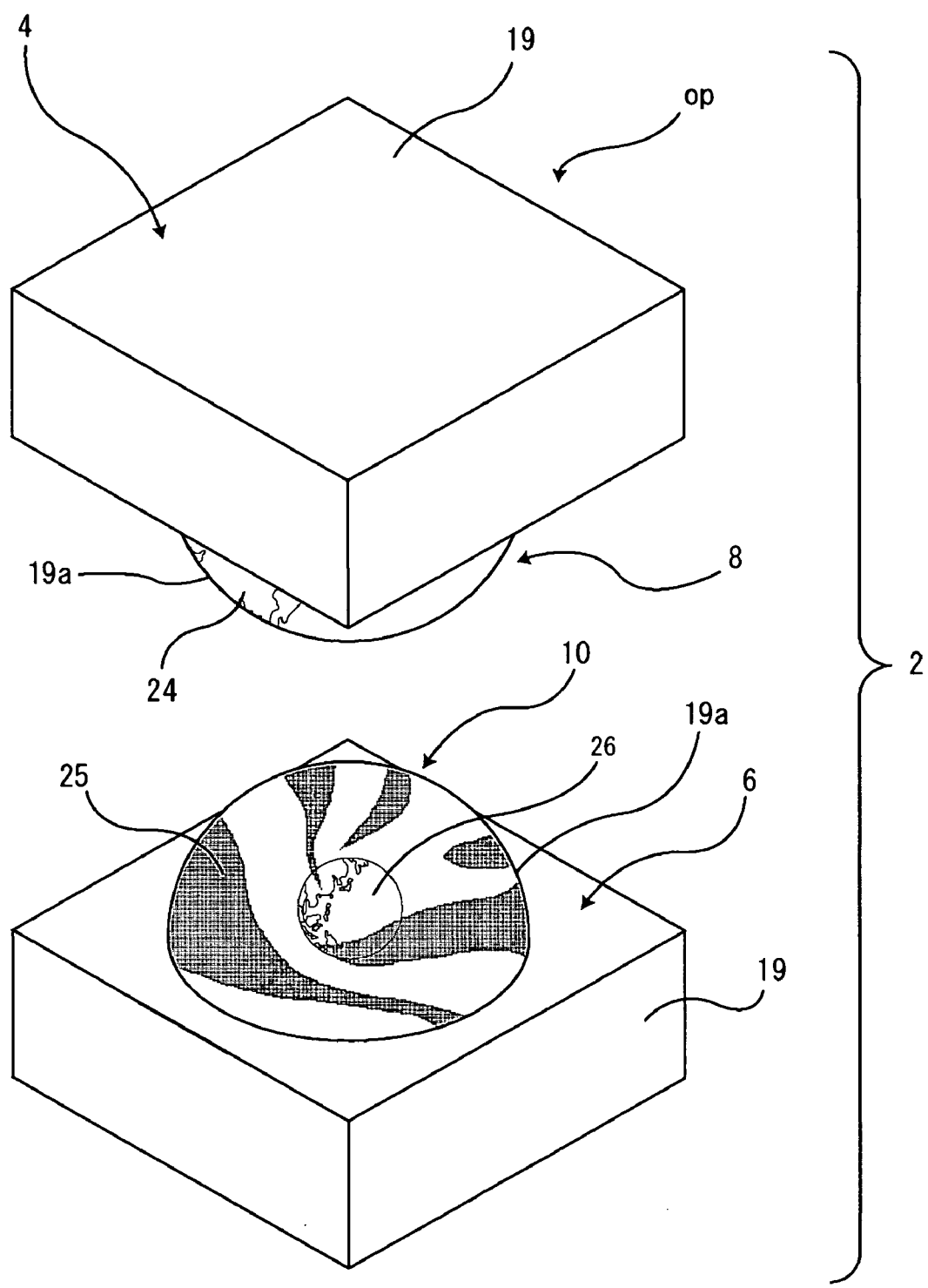
FIG. 10 is a schematic perspective view showing a fifth alternative embodiment of three-dimensional display device.

It is noted that the image reproduction surface 8 refers to an integral or associated part of the first image reproduction unit 4, from which the first image 24 is visually reproduced, and likewise, the image indication surface 10 refers to an integral or associated part of second image reproduction unit 6, from which the second image 25 is also visually reproduced. Those two surfaces 8 and 10 are disposed in their respective image reproduction units 4 and 6 at a point nearest to the observer (34). For example, in the first mode of the three-dimensional display device 2 shown in FIG. 1, the image reproduction and indication surfaces 8 and 10 refer to a first screen 12 and a second screen 16, respectively. On the other hand, in the case of a liquid crystal display device or an organic EL display device (i.e. organic electroluminescent display device) as shown in FIG. 10, the first and second image reproduction units 4 and 6 (at 19 and 19) have their respective integral screens (at 19a and 19a) due to the structural nature of those particular display devices. Therefore, in that case, it can be generically stated that the image reproduction surface 8 refers to an integral screen surface of the first image reproduction unit 4, and likewise, the image indication surface 10 refers to an integral screen surface of the second image reproduction unit 6.

Figure 3:
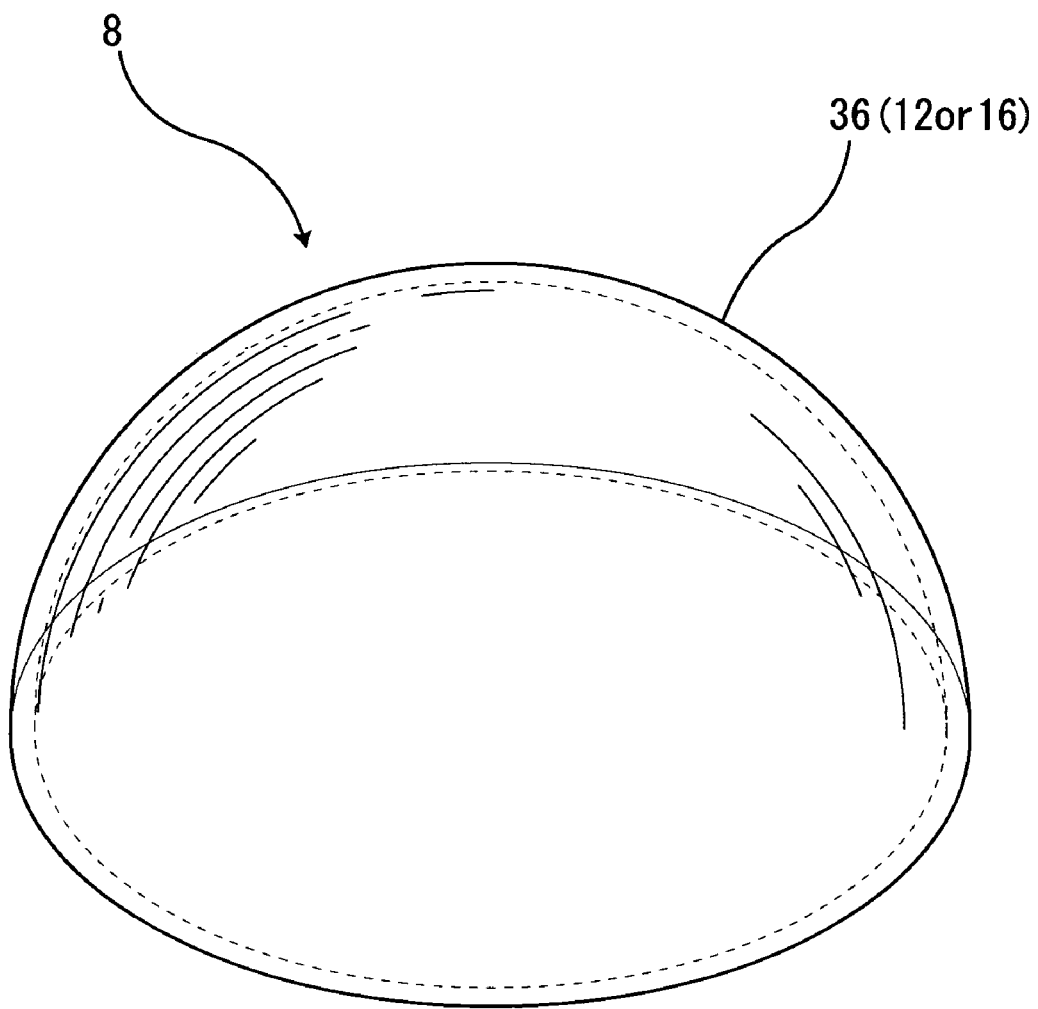
FIG. 3 is a schematic perspective view showing a semispherical mode of first or second screen used in the three-dimensional display device.

As understandable throughout the drawings, preferably, the two image reproduction and indication surfaces 8 and 10 are each curved in shape. Such curved surface refers to any form of surface having curved configuration or any spherical form of surface. The curvature of such curved surfaces 8 and 10 may be set properly, depending on specific requirements and design for desired configuration and arrangement of the display device 2. Alternatively, as suggested in FIG. 12, only the image reproduction surface 8 may be formed flat, or, as depicted in FIG. 3, each of the image reproduction and indication surfaces 8 and 10 be formed in a semispherical shape, as will be described later.

The size and shape of those image reproduction and indication surfaces 8 and 10 may be properly preset, considering the size and shape of an image 24 or 25 to be reproduced and indicated, as well as the conditions and circumstances where the three-dimensional display device 2 is to be installed and arranged. Also, needless to mention, the image reproduction and indication surfaces 8 and 10 should not necessarily be identical in size and shape to each other, but their dimensions and configuration may differ from one another as required.

In accordance with a novel concept of the present invention, the above-discussed image reproduction and indication surfaces 8 and 10 basically face each other, and the image indication surface 10 also serves as a reflective surface which, as will be elaborated, can reflect a first image 24 reproduced from the first image reproduction unit 4.

Otherwise stated, the three-dimensional display device 2 is basically constructed such that the image reproduction surface 8 of first image reproduction unit 4 is disposed in an opposedly facing relation with the image indication surface 10 of second image reproduction unit 6, and that a first image 24 is reproduced at the first image reproduction unit 4, while on the other hand, a second image 25 is indicated at the second image reproduction unit 6, so that the first image 24 reproduced from the first image reproduction unit 4 is reflected by the reflective image indication surface 10 of the second image reproduction unit 6, thereby forming a reflected image 26 thereon. In this regard, as will be explained optically below, it is actually indeed that an observer 34 looks at both of the following two images upon the image indication surface 10; the reflected image 26 corresponding to the first image 24; and the second image 25, but, those reflected and second images 26 and 25 overlap each other with different focal points, as a result of which, in the eyes of person looking thereat, the reflected image 26 is viewed as if it was a three-dimensional image floated inwardly of the image indication surface 10.

Figure 11:
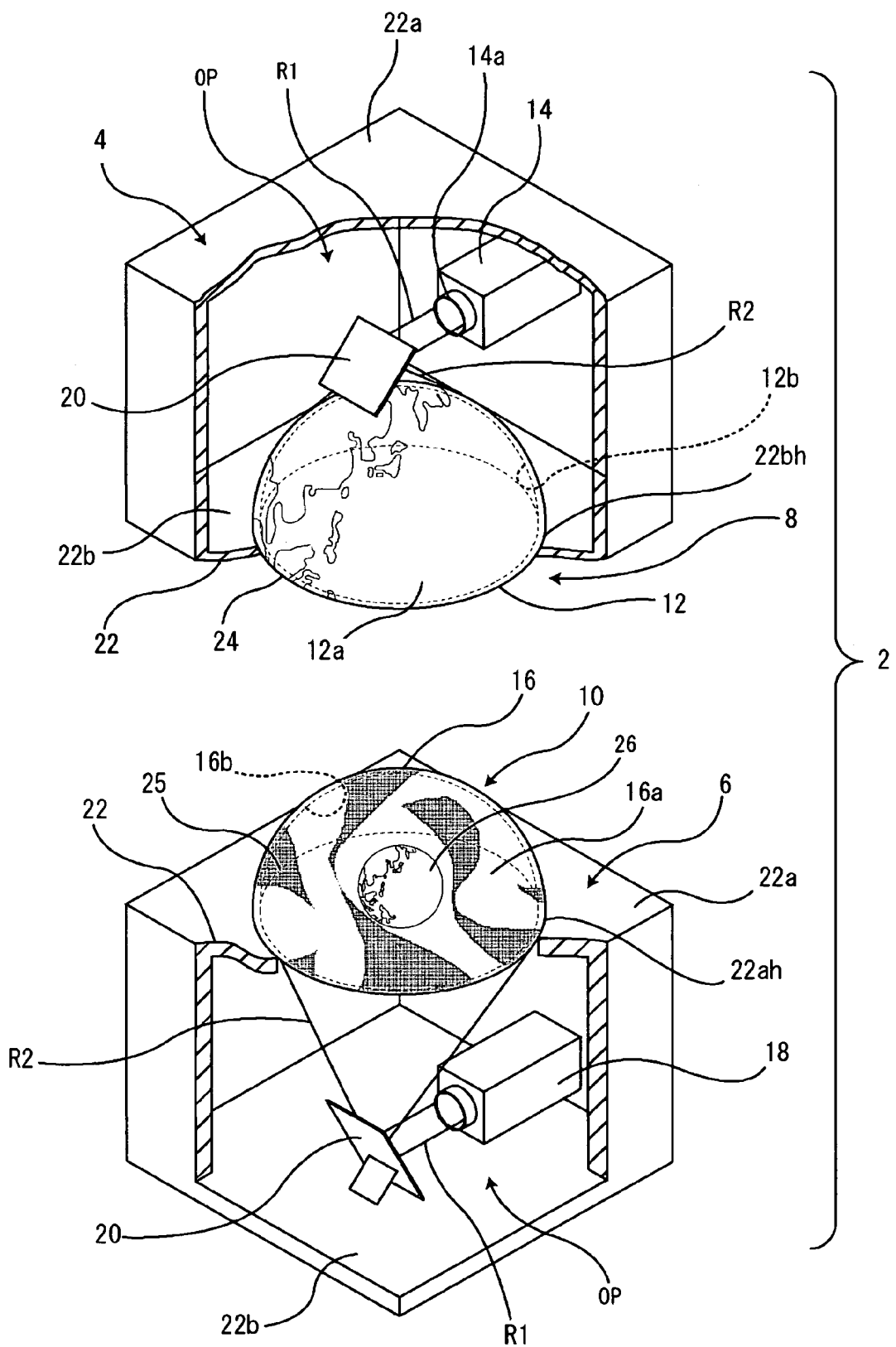
FIG. 11 is a partly broken schematic perspective view showing a sixth alternative embodiment of three-dimensional display device.

In this connection, as far as the image reproduction and indication surfaces 8 and 10 are of the illustrated curved or spherical shape, it may be so arranged that, as shown in FIG. 1, both convex outer surface sides (at 12a and 16a) of the curved surfaces 8 and 10 are disposed in a mutually faced relation, or alternatively, as shown in FIG. 11, it is possible to face the concave inner surface side (at 12b) of the image reproduction surface 8 to the convex outer surface side (at 16a) of the image indication surface 10.

Figure 13:
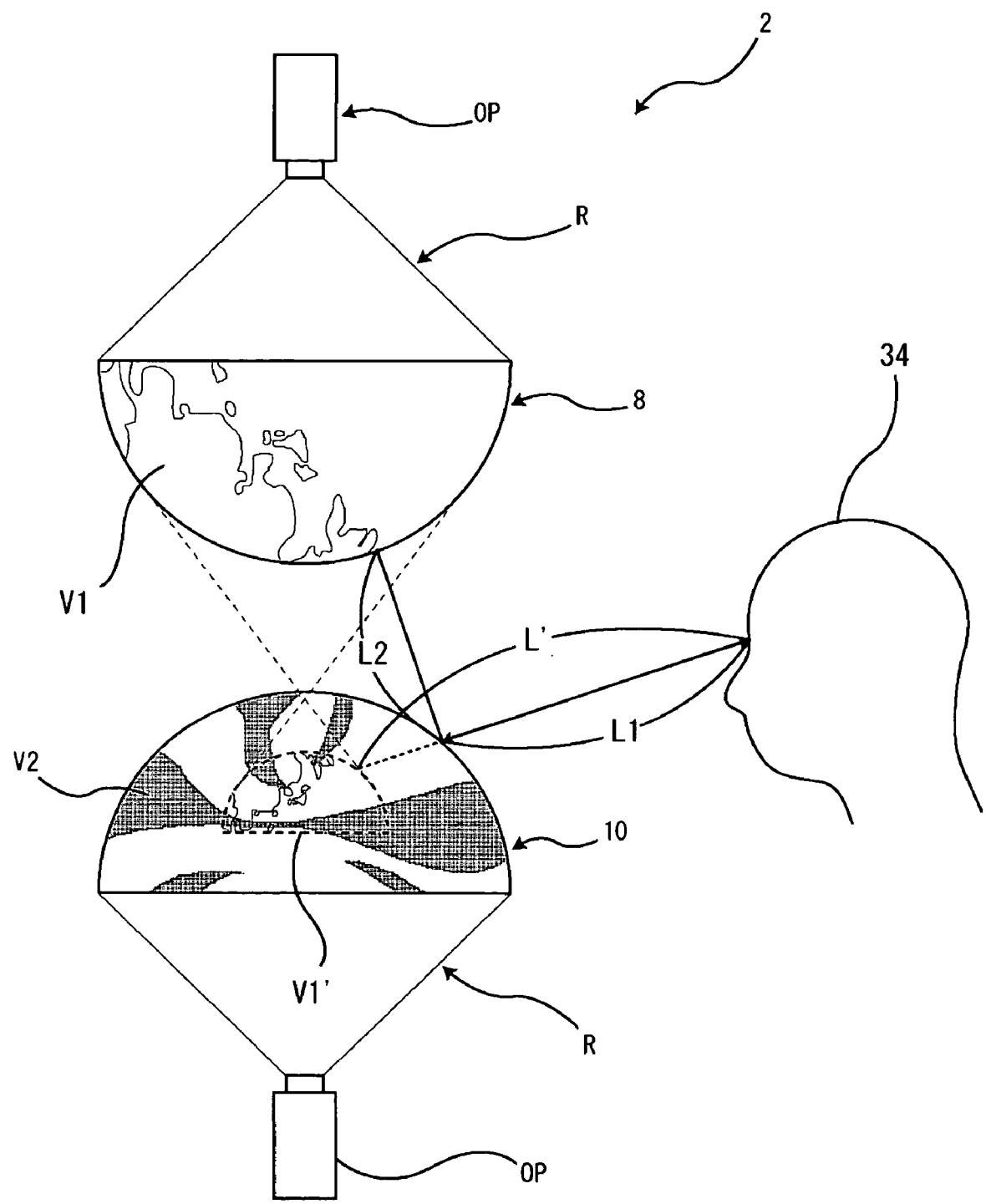
FIG. 13 is a diagram for explanatorily showing how an image is indicated, reflected and viewed as if it was a three-dimensional image in accordance with the three-dimensional display device of the present invention.

Referring now to FIG. 13, a basic optical description will be made of how the reproduced first image 24 is to be viewed by an observer 34 as a three-dimensional image 26 through the present display device 2.

Here, for the sake of general explanation, a new generic designation V1 is given to a first image reproduced from the image reproduction surface 8, which corresponds to the first image 24, whereas a new generic designation V2 is given to a second image reproduced from the image indication surface 10, which corresponds to the second image 25. With respect to the reflected image 26, a new generic designation V1' is used. Further, a designation L1 refers to a distance between the image indication surface 10 and the eyes of the observer 34, and a designation L2 refers to a distance between the image indication surface 10 and the image reproduction surface 8. But, that designation L2, more precisely stated, refers to a distance of a line which extends from a given gazing point in the image indication surface 10, at a right angle, up to the image reproduction surface 8, wherein the given gazing point is a point at which the eyes of observer 34 gaze.

Now, when the observer 34 looks at the image indication surface 10, what he or she can visually recognize is both second image V2 and the reflected image V1'. Under such state, since the second image V2 is reproduced and indicated on the image indication surface 10, a focal length of the observer 34 to that second image V2 is equal to the distance L1 between the eyes of the observer 34 and the image indication surface 10. Otherwise sated, the eyes of observer 34 have a focal length L1 with respect to the second image V2. On the other hand, the image V1' is reflected by and indicated on the image indication surface 10, and therefore, the observer 34 views such image V1' at a point away a distance L' from his or her eyes, the distance L' being obtained by a total amount of the foregoing distances L1 and L2. Namely, the eyes of observer 34 have a focal length L' with respect to the image V1'.

From such optical viewpoint, it is thought that a parallax occurs in the eyes of observer 34 due to the difference between the two focal lengths L1 and L', thereby providing a stereoscopic effect to the observer's eyes, so that the image V1' is viewed as if it was a three-dimensional image floated inwardly of the image indication surface 10 in the eyes of observer 34, while the second image V2 surrounded the image V1'. It is added that such three-dimensional image effect is enhanced and pronounced by the convex surface of curved image indication surface 10. That is, that particular convex surface 10 reflects the image V1' in a perspective way so to speak, whereby a focus of the eyes of observer 34 to the thus-reflected image V1' is shifted to a far distant point, hence increasing the focal lengths L1 and L' accordingly. This enhances the stereoscopic image effect to the observer 34 who can view a relatively deep and vivid three-dimensional appearance of the image V1'.

Again, the wording, "reflective surface", refers to a reflective aspect of the image indication surface 10 which can reflect the image 24 reproduced from the first image production unit 4 and indicates the same thereon, so that the corresponding reflected image (at 26) can be viewed by an observer 34 who looks at the surface 10. The reflectivity of the image indication surface 10 is not limitative. For example, the image indication surface 10 may include a mirror-like surface with a sufficient reflectivity to clearly reflect the image (e.g. 24) reproduced from the first image production unit 4 and indicate a clear entirety of the reflected image thereon. Or, the image indication surface 10 may have a low-reflective surface to indicate thereon an unclear reflected image reproduced from the first image reproduction unit 4. In any case, the image indication surface 10 may be treated and processed properly, using any desired method and materials, so as to include a required reflective surface. For example, any material with a certain reflective property, such as a mirror of light-transmissive type (e.g. a half mirror), an acrylic material or a glass material, may be directly used for the image indication surface 10. As will be specified, such material may preferably be used for forming a reflective surface region 30 (see FIG. 7) in the image indication surface 10 or screen 16. In the case where the reflectivity of the surface 10 is low, a suitable filter or coating may be applied thereto, which acts to increase the reflectivity, or any suitable process or treatment be made to the surface 10 in order to increase its reflectivity.

On the other hand, the image reproduction surface 8 may preferably be treated to include a non-reflexive surface region 33 (see FIG. 5) which does not reflect the second image (25) reproduced from the second image production unit 6. This is because, if the outer convex surface side (at 12a) of the image reproduction surface 8 has a high reflectivity, both two images 24 and 25 reproduced from the respective two surfaces 8 and 10 and the reflected image 26 from the surface 10 are infinitely reflected between the two oppositely facing surfaces 8 and 10, as a result of which, an endless number of the images 24 and 25 and reflected images 26 are undesirably indicated on the surface 10. Therefore, it is important that the outer convex surface side (at 12a) of the image reproduction surface 8 should have a non-reflexive property or region to prevent the image 25 reproduced at the surface 10 from being reflected by that particular surface 8, so that only the first image 24 from the surface 8 is reflected by and indicated as a reflected image (26) on the surface 10. In this regard, the degree of non-reflectivity of the non-reflexive surface region (at 33) may be adjusted and set properly according to given conditions and requirements, such as a distance between the image reproduction and indication surfaces 8 and 10, or a quantity of light used for projecting each of the images 24 and 25 from the respective two surfaces 8 and 10. Hence, if the image reproduction surface 8 itself has a high reflective outer surface side, a suitable filter or other suitable material may be applied to such high reflective outer surface side in order to lower a light transmissivity of the image reproduction surface 8 to an appropriate degree. In any case, it is preferable to provide the outer side of that surface 8 with a proper non-reflexive property by means of any suitable material and process.

A light shielding member 22 may preferably be provided about the peripheral edge of the image reproduction surface 8. That is, in the absence of such light shielding member 22, a light shone from a light source (at 14) and the image 24 reproduced via such light from the image reproduction surface 8 will expand outwardly to surrounding things and objects, so that the corresponding undesired images of those surrounding things and objects are transmitted via the light to the image indication surface 10 and are reflected thereby. For that reason, the light shielding member 22 may importantly be attached around the image reproduction surface 8 so as to shield a light which tends to outwardly shine from the light source from the periphery of the surface 8, thereby preventing the afore-said another images from being projected to and reflected by the surface 10. In particular, due to such light shielding member 22, no light is shone outwardly from the image reproduction surface 8, thereby allowing a clear and vivid image 24 to be reproduced therefrom and projected to the image indication surface 10, whereby the image 24 can be reflected by and indicated on that surface 10 as a corresponding reflected image (26) in a clear-cut and vivid fashion.

The light shielding member 22 may be formed in a proper shape from a blackout curtain material, wooden materials, or a concrete block. The light shielding member 22 shown in the drawing is of a cubic configuration, by way of example, and a detailed description thereof will be made later.

Reference is now made to FIG. 1 showing a first exemplary embodiment of the three-dimensional display device 2, according to which, the first image reproduction unit 4 is disposed right above the second image reproduction unit 6.

Figure 4:
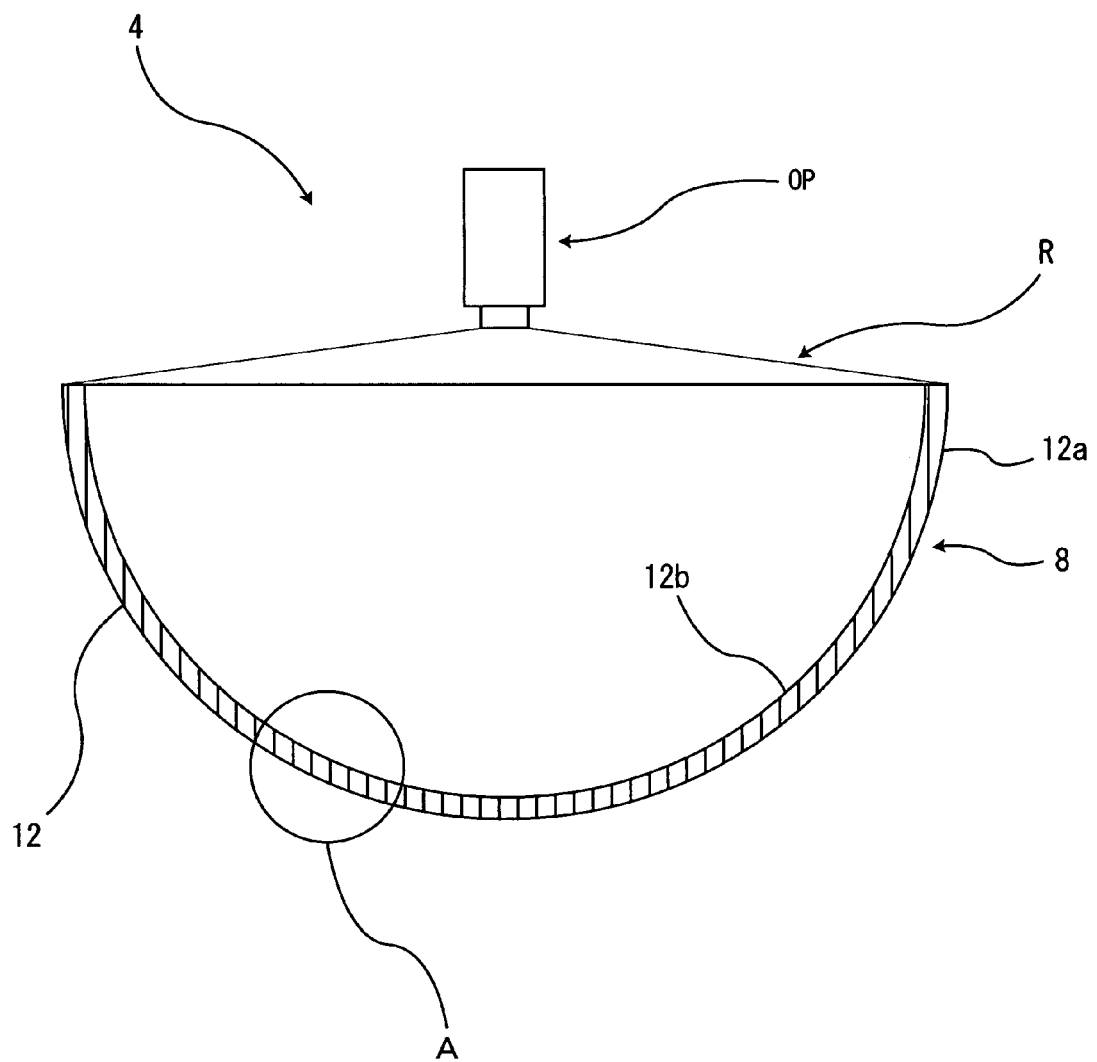
FIG. 4 is an enlarged sectional view of a first screen used in the three-dimensional display device.

The first image reproduction unit 4 is comprised of: a first screen 12 of curved or dome configuration which is one exemplary mode of the above-described image reproduction surface 8; a light shielding member 22 of a cubic block shape with a hollow therein; and a projection means OP for projecting light and the first image 24 toward the first screen 12. The basic structure of this first image reproduction unit 4 is shown in FIG. 4, from which it is generically seen that a light and image 24 are projected from the projection means OP to the second screen 16, as indicated by R. Specifically, the light shielding member 22 has a circular hole 22bh formed in the bottom wall 22b thereof, and, fixedly attached to that circular hole 22bh is the circular edge of the first screen 12, so that the convex outer surface side 12a thereof projects outwardly from the bottom wall 22b of the light shielding member 22, while the concave inner surface side 12b thereof faces inwardly of the light shielding member 22. The projection means OP in the present embodiment comprises a known projector 14 and a reflector 20, both of which are disposed within the light shielding member 22. As shown, the projector 14 is disposed near to the upper wall 22a of light shielding member 22, with an optical axis or central axis of its lens portion 14a extending along a horizontal line, while the reflector 20 is supported by a support member (not shown) right above the first screen 12 and inclined at a predetermined angle, such that a first image 24 is projected from the projector lens portion 14a, as indicated by R1, to the reflector 20 by which the image 24 is in turn reflected and projected donwardly to the first screen 12, as indicated by R2, thereby reproducing and indicating the first image 24 on that first screen 12.

Figure 6:
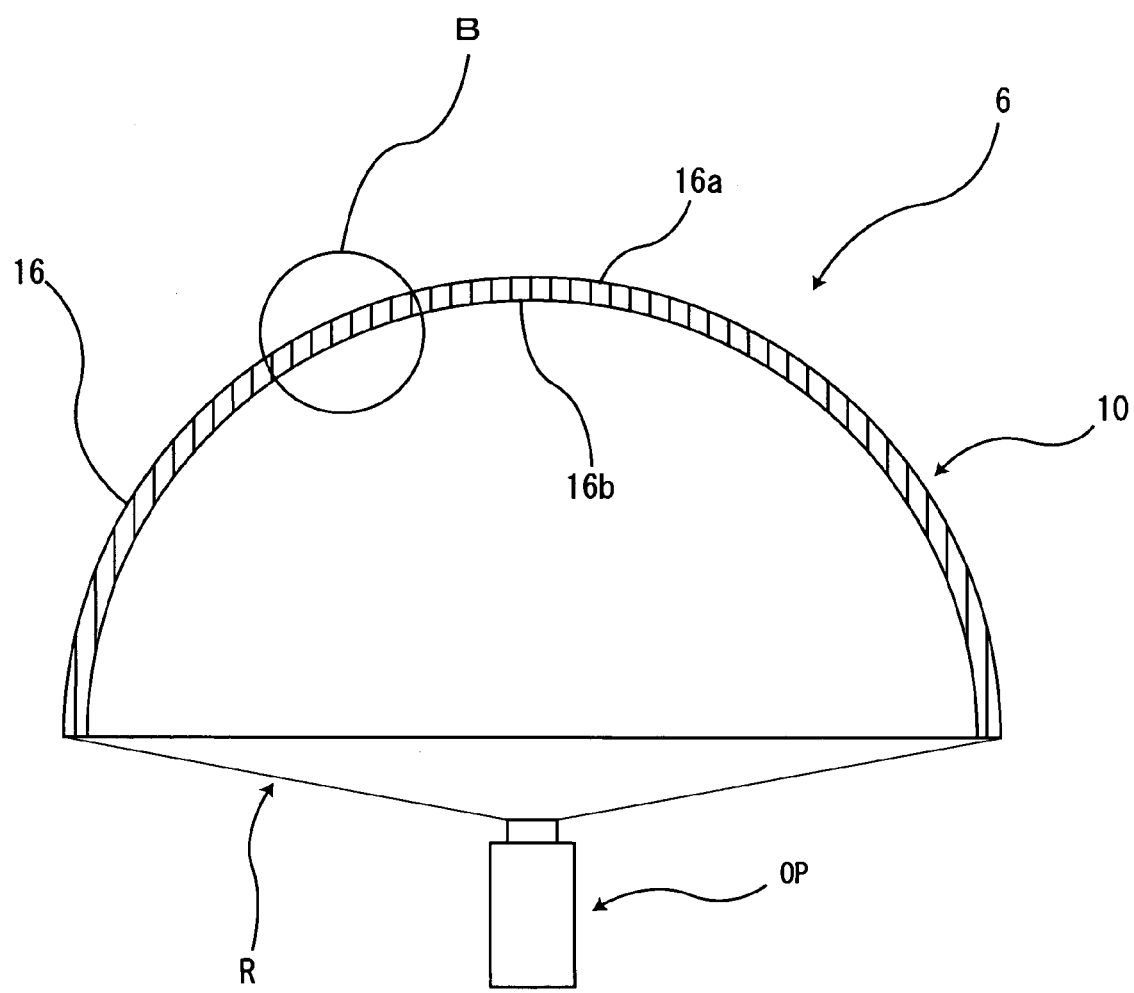
FIG. 6 is an enlarged sectional view of a second screen used in the three-dimensional display device.

On the other hand, the second image reproduction unit 6 is formed in a substantially same manner as the foregoing first image reproduction unit 4, and the basic structure of that unit 6 is shown in FIG. 6, from which it is generically seen that a light and image 25 are projected from the projection means OP to the second screen 16, as indicated by R.

Briefly stated, the second image reproduction unit 6 is constructed such that a second screen 16 of a curved or dome configuration, an exemplary mode of the above-described image indication surface 10, is fixed at the circular edge thereof to the circular hole 22ah formed in the upper wall 22a of a cubic light shielding member 22, as illustrated, and that a known projector 18 and a reflector 20 are provided within the light shielding member 22, as one exemplary mode of the light projection means OP. As shown, the projector 18 is disposed on the bottom wall 22b of the light shielding member 22, with an optical or central axis of the lens portion 18a thereof extending along a horizontal line, and a reflector 20 is also disposed on the bottom wall 22b at a point right below the second screen 16 and inclined at a predetermined angle, such that a second image 25 is projected from the projector lens portion 18a, as indicated by R1, to the reflector 20 by which the image 25 is in turn reflected and projected donwardly to the second screen 16 as indicated by R2, thereby reproducing and indicating the second image 25 from that second screen 16.

The reflector 20 may be an ordinary mirror, but, in most cases, the ordinary mirror has a glass layer attached on its surface. In that case, it is highly possible that the image (24 or 25) will be diffusely reflected or refracted by that glass layer and can not be projected precisely to the screens (12 or 16). Thus, if the ordinary mirror used has a certain diffuse reflection and refraction, it is necessary to make a surface treatment thereto so as to eliminate the diffuse refection and refraction therefrom, or to use a special reflective mirror having no diffuse reflection or refraction. Also, most of the ordinary mirrors reflect the image (24 or 25) inversely, with the result that a corresponding inverse image is projected to and indicated on the screen (12 or 16), in which case, it is necessary to provide a means or arrangement for reversing the inversely reflected image, so that a precise image is indicated on the screen. The reflector 20 is not limited to such reflective mirror, but may be a suitable alternative or a reflector device or system. It is noted however that the ordinary mirror with diffuse and inverse reflection property may be deliberately used for some artistic presentation purposes or for particular stage directions.

Figure 5:
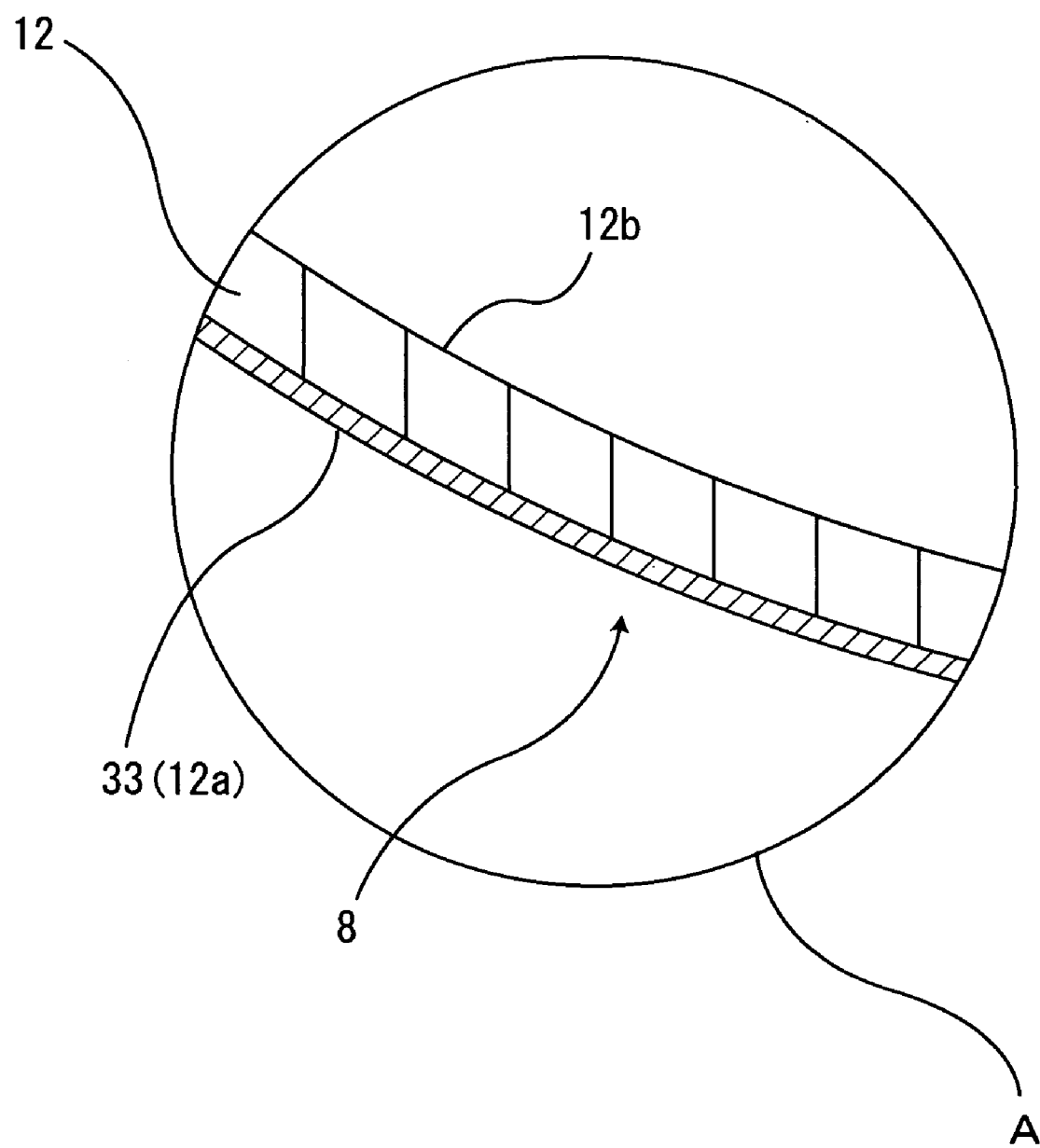
FIG. 5 is an enlarged view corresponding to a part "A" in the FIG. 4.
Figure 8:
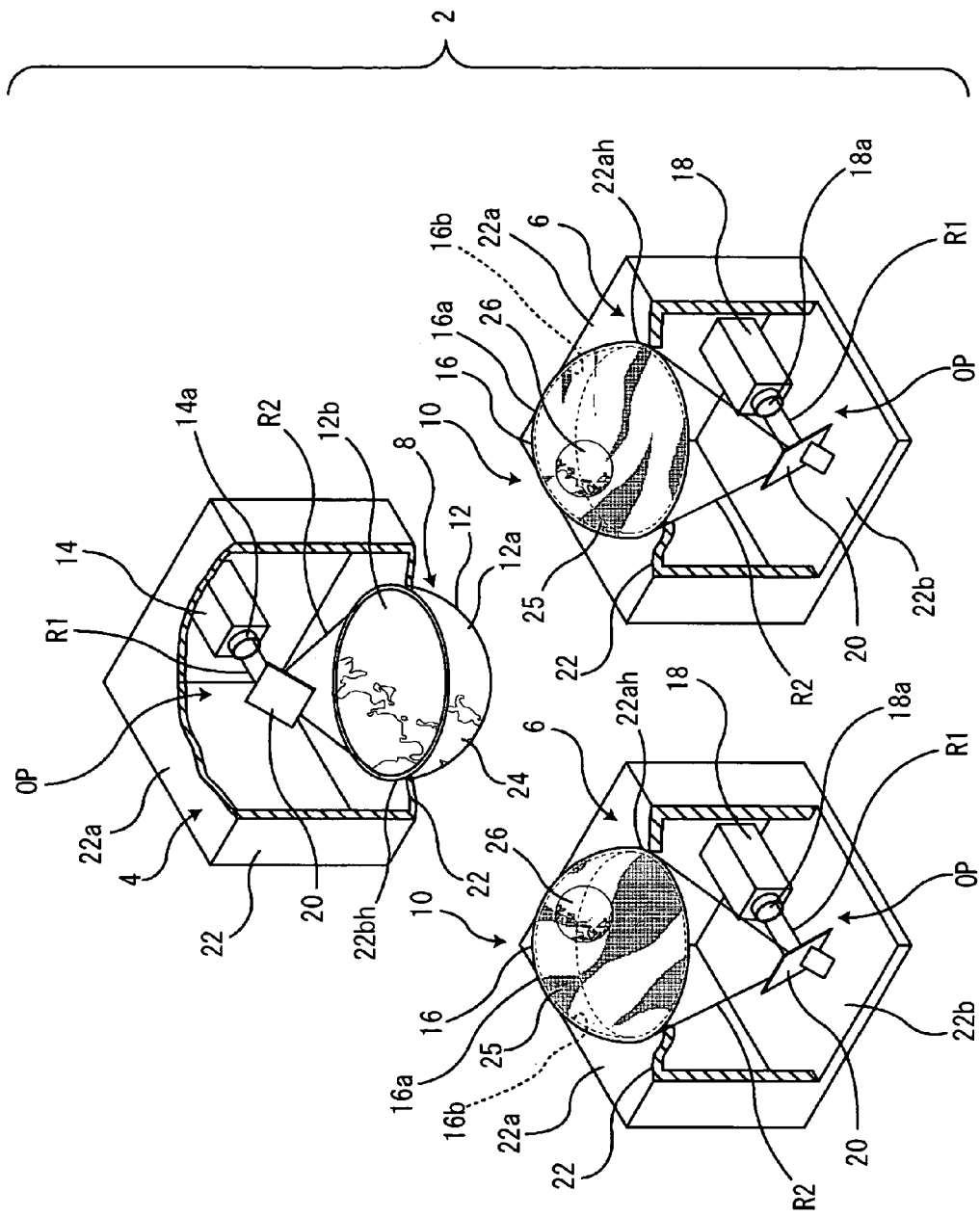
FIG. 8 is a partly broken schematic perspective view showing a third alternative embodiment of three-dimensional display device.

As shown in FIGS. 4 and 8, the first screen 12 may be formed in a semispherical shape having a convex outer surface 12a and a concave inner surface 12b. The shown first screen 12 is of a light-transmissive type and preferably formed from a transparent acrylic material, but may be formed from a glass or transparent resin material. As best shown in FIG. 5, the convex outer surface 12a is provided with a non-reflective surface region 32 for the previously stated reasons. In some cases, the light trasmissive material forming the first screen 12 inherently has a non-reflective outer surface, which does not require forming any non-reflective surface layer thereon. But, if the material of the first screen 12 has no non-reflective surface, it is necessary, for example, to spray and adhere back powdery materials appropriately to the outer surface 12a of the first screen 12, or to fixedly attach a suitable fitter thereto so as to provide a non-reflective surface 33. Of course, any other suitable treatment or process may be effected for that purpose.

Figure 7:
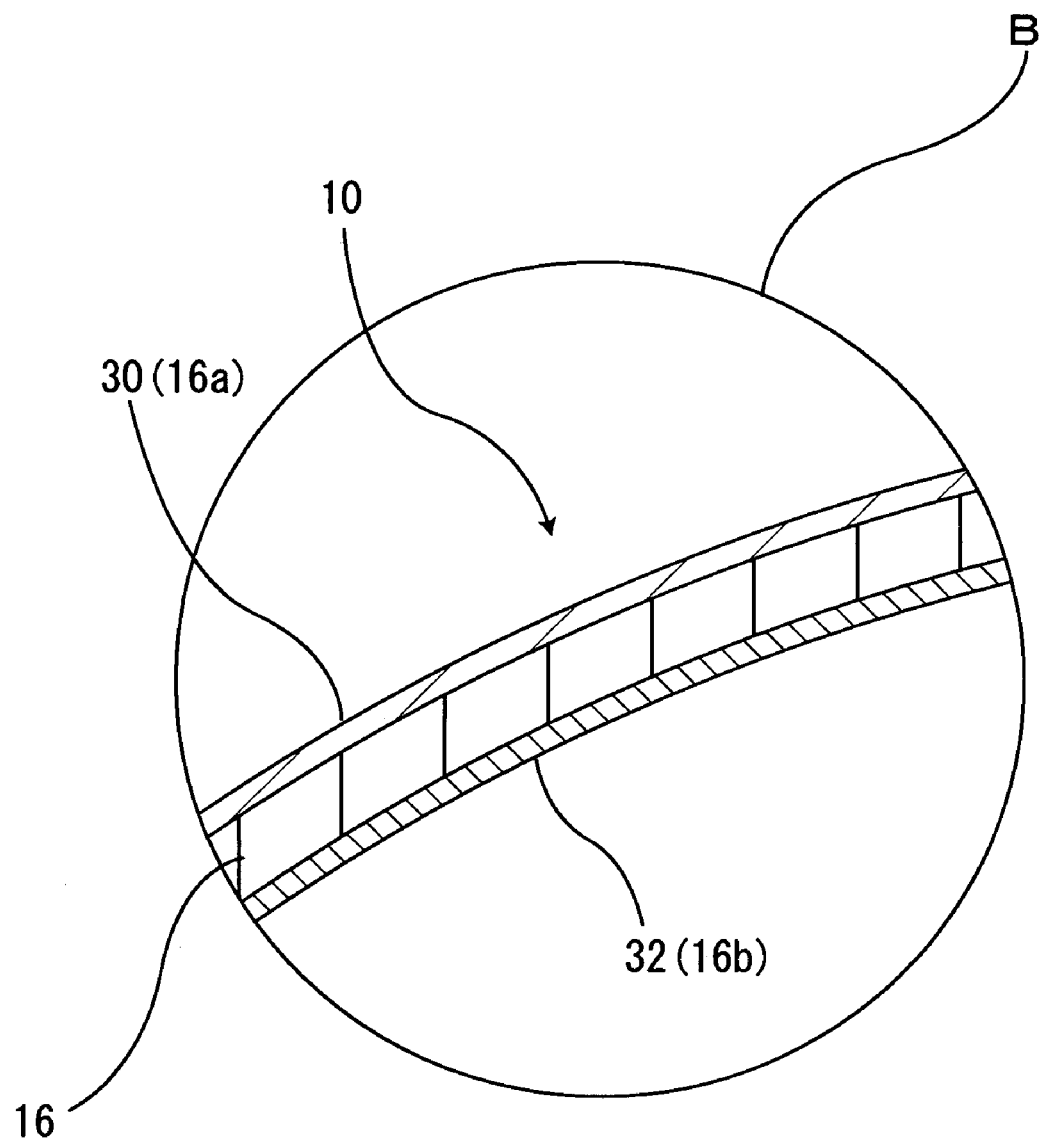
FIG. 7 is an enlarged view corresponding to a part "B" in the FIG. 6.

As shown in FIGS. 6 and 7, the second screen 16 may also be formed in a semispherical shape, using the above-stated acrylic or suitable transparent material. In the case of this second screen 16, its convex outer surface 16a is normally of an inherent reflective property and thus there is no need for special reflective treatment thereto. In FIG. 7, a reflective surface of the second screen 16 is generically designated by 30. But, if such light transmissive semispherical screen 16 has a low reflectivity, it is preferable to provide its outer surface 16a with a sufficient reflectivity, as by subjecting it to a proper known treatment or process thereto to provide a desired reflective surface region 30 therein.

On the other hand, as suggested in FIG. 7, the concave inner surface 16b of the second screen 16 may be provided with a diffusely reflective surface region or layer 32 for diffusely reflecting the second image 25 projected from the projector 18 thereto. Such diffusely reflective surface layer 32 may be formed by spraying and adhering known back powdery materials appropriately to the second screen inner surface 16b, or by fixedly attaching a suitable fitter thereto. Of course, any other suitable treatment and process may be effected for that purpose.

It is noted here that, providing the first screen 12 with such non-reflective surface 33 and providing the second screen 18 with such diffusely reflective surface 32 may be done by one and same treatment or process, or different treatments or processes, whichever is better.

Accordingly, in the same manner as explained earlier with reference to FIG. 13, in the present embodiment, the first image 24 is projected from the projector 14 and reflector 20 to the first screen 12, while at the same time, the second image 25 is projected from the projector 18 and reflector 20 to the second screen 16. Then, the first image 24 from the first screen 12 is reflected by and indicated on the second screen 16 as a reflected image 26, so that the reflected image 26 is viewed in the eyes of an observer (at 34) as if it was a three-dimensional image floated inwardly of the second screen 16, while on the other hand, the second image 25 is viewed as if it was situated outwardly of the image 26 or surrounded the same. (As far as the shown embodiment is concerned, the second image 25 looks faint and vague, which is due to the diffuse reflection effect stated above regarding the diffusely reflective surface 32 of second screen 16) The shown three-dimensional image 26 is a part of spherical world map or a half spherical portion of earth, by way of example.

Now, another alternative embodiments will be described below, but, since they are substantially identical in structure to the above-described first embodiment, it should be noted that any specific description on the common constituent elements and parts between the first embodiment and another alternative embodiments to be described hereinafter is omitted for the sake of simplicity, and therefore, all like designations to be given hereinafter correspond to all like designations having been given in the first embodiment.

Figure 2:
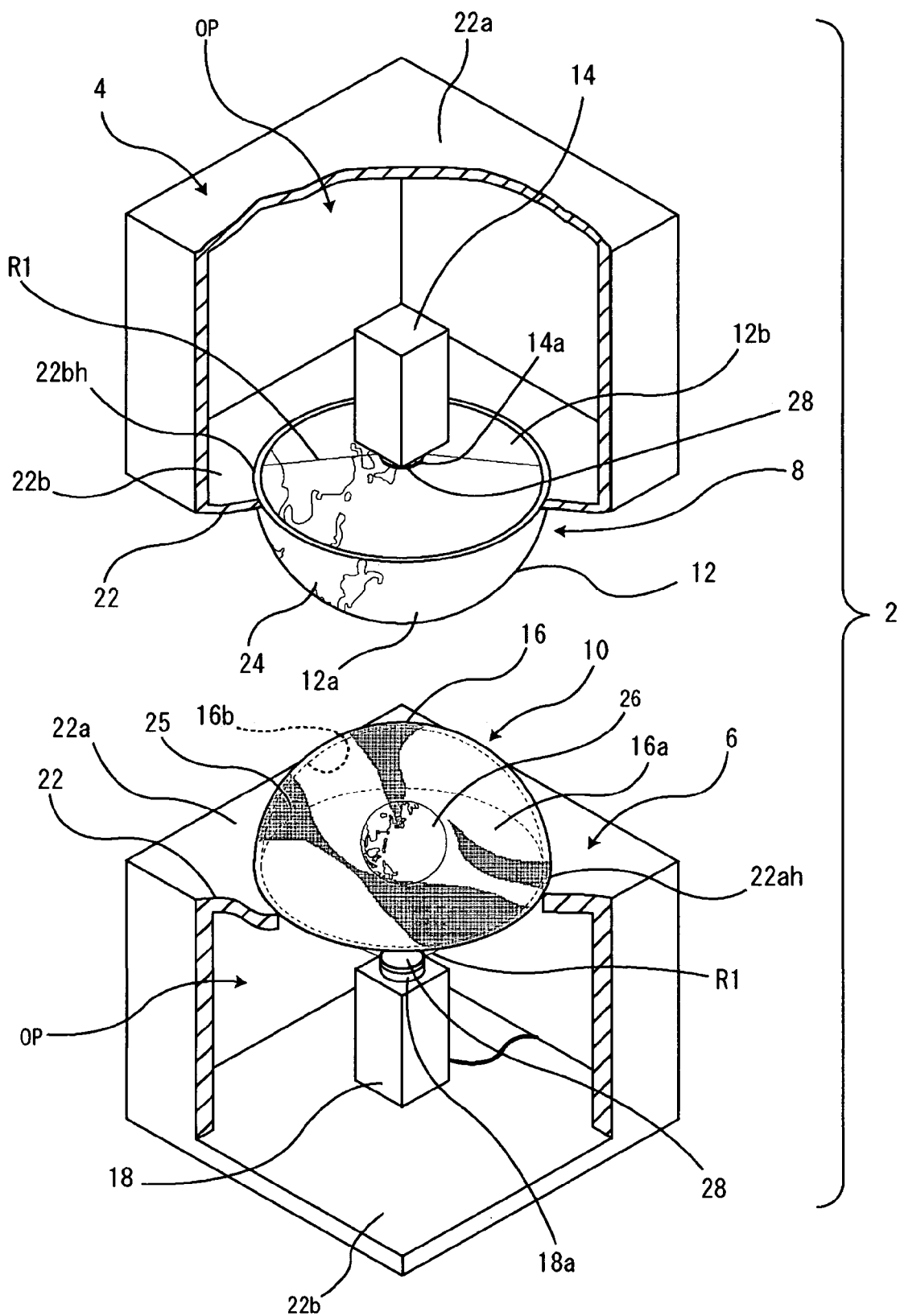
FIG. 2 is a partly broken schematic perspective view showing a second alternative embodiment of three-dimensional display device.

FIG. 2 shows a second alternative embodiment of the three-dimensional display device 2, which is identical in structure to the foregoing first embodiment, but differs therefrom only in terms of the projection means OP. In this particular embodiment, the projection means OP comprises a first projector 14 and a second projector 18, only, which are respectively provided in the first and second image reproduction units 4 and 18. As shown, the first projector 14 is disposed vertically, with its lens portion 14a being oriented downwardly to the first screen 12, in order that a first image 24 is directed and projected therefrom to the first screen 12 as indicated by R1. To insure precise projection of the first image 24 to the entire concave inner surface 12b of the first screen 12, an adequate fish-eye lens 28 should be provided to the lens portion 14a of first projector 14. On the other hand, the second projector 18 is disposed vertically, with its lens portion 18a being upwardly oriented to the second screen 16, and an adequate fish-eye lens 28 may also be provided to that lens portion 18a to insure precise projection of the second image 25 to the entire concave inner surface 16b of second screen 16.

Such fish-eye lens is particularly required in the case where the screen 12 or 16 is of the semispherical shape as shown in FIG. 3. This is because the semispherical screen (12 or 16) has varied curvature in any point relative to an ordinary lens used in the projector (14 or 18), in which case, there occurs an aberration between the ordinary lens and the semispherical screen, thereby resulting in the image (24 or 25) projected from the projector being indicated in a distorted way on the screen. Therefore, using a suitable fish-eye lens (28) in the projector makes it possible to correct such aberration, so that a clear and precise image (24 or 25) is indicated on the screen (12 o 16). As far as the FIG. 2 is concerned, the projectors 14 and 18 are disposed adjacent to their respective first and second screens 12 and 16, but, this is not limitative, because the distance between the projector and screen may be set properly, depending on various conditions and requirements, such as a kind of fish-eye lens to be used, a performance of the fish-eye lens, or the curvature of the semispherical screen. In this second embodiment also, the first image 24 is reflected by and indicated on the second screen 16 as a reflected image 26, so that the reflected image 26 is viewed in the eyes of an observer (at 34) as if it was a three-dimensional image floated inwardly of the second screen 16, while on the other hand, the second image 25 is viewed as if it was situated outwardly of the image 26 or surrounded the same.

FIG. 8 shows a third alternative embodiment of the three-dimensional display device 2, wherein two second image reproduction units 6 and 6, each being structurally identical to the second image reproduction unit 6 of the first embodiment, are provided with respect to one first image reproduction unit 4 which is also structurally identical to that of the first embodiment. This embodiment is identical to the first embodiment in terms of constituent elements and parts, except that those two second image reproduction units 6 are disposed below one first image reproduction unit 4, In the present third embodiment, the first and second screens 12 and 16 are also of the semispherical light-transmissive type stated above, and therefore, the first image 24 is projected radially from the semispherical surface of the first screen 12 to a wide range of space thereblow, as indicated by R3in FIG. 8. Hence, as shown, the thus-projected image 24 is reflected by each of the two second semispherical surfaces respectively of the two second screens 16, whereupon a reflected three-dimensional image 26 is viewed from each of the two second screens 16 in the eyes of observer in the same way as described in the first embodiment, which is also based on the basic optical description stated previously with reference to FIG. 13.

It is however noted that this embodiment is not limited to the two second image reproduction units 6, but, more than two or a plurality of the second image reproduction units 6 may be arranged in relation to one first image reproduction unit 4, so that the three-dimensional images 26 will be indicated in each of the plurality of second screes 16. Of course, in contrast to the embodiment shown in FIG. 8, a plurality of the fist image reproduction units 4 may be properly arranged relative to one second image reproduction unit 6, in order that various different images are projected from the plurality of first screes 12 to one second screen 16 from which a plurality of various different reflected images (as at 26) are viewed in observer's eyes as if they were three-dimensional images floated inwardly of the second screen 16, while on the other hand, the second image 25 is viewed as if it was situated outwardly of the reflected three-dimensional images or surrounded the same. At any rate, a desired number of the first and second image reproduction units 4 and 6 may be properly arranged in any desired fashion.

Figure 9:
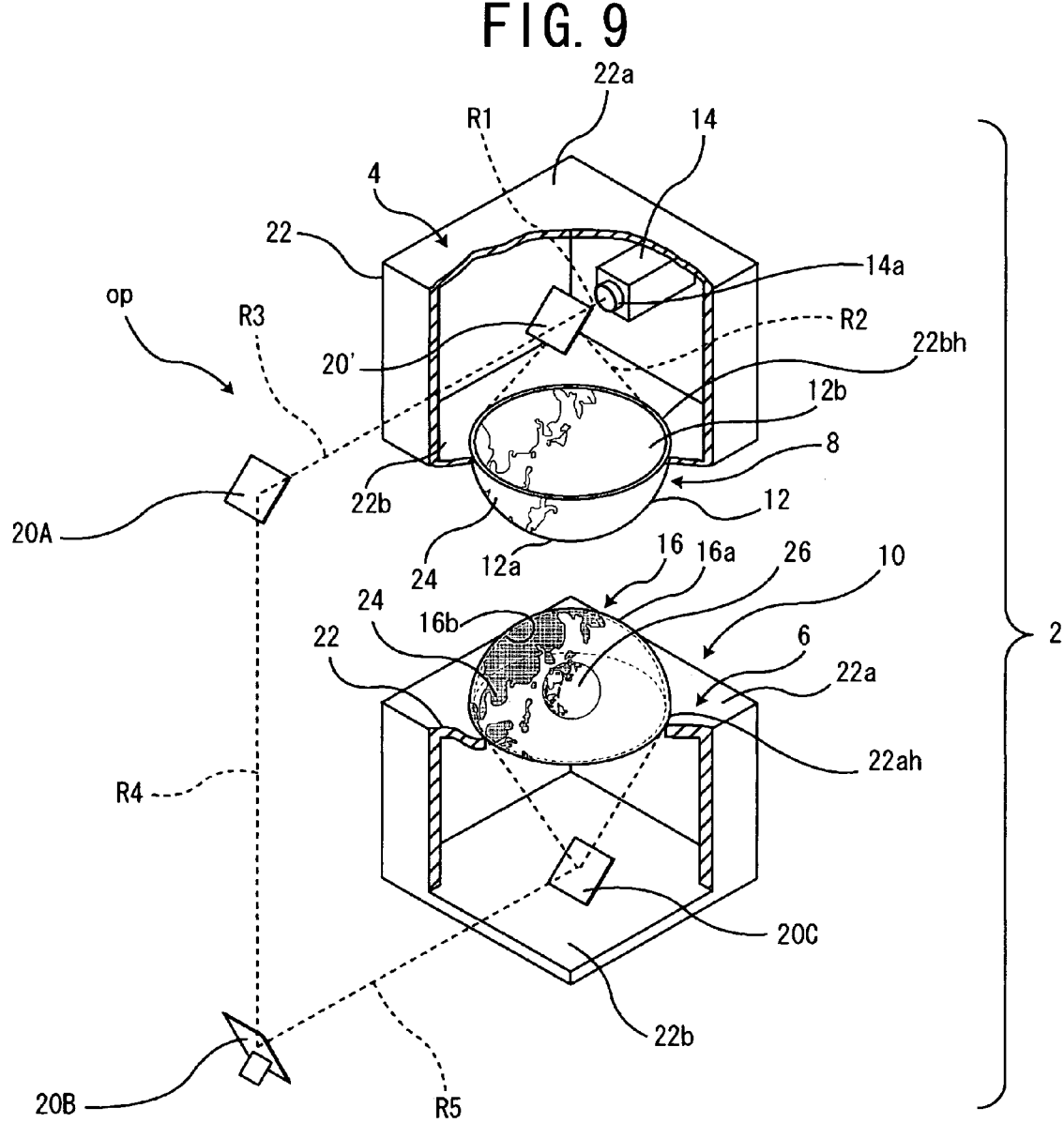
FIG. 9 is a partly broken schematic perspective view showing a fourth alternative embodiment of three-dimensional display device.

FIG. 9 shows a fourth alternative embodiment of the three-dimensional display device 2 which is basically identical in structure to the foregoing first embodiment, but only differs therefrom in terms of the projection means OP which, according to this embodiment, functions to project one and the same image 24 from each of the first and second image reproduction units 4 and 6. As illustrated, such projection means OP is comprised of: one projector 14; and a reflector assembly formed by a half mirror 20' disposed in the first image reproduction unit 4, a first and second reflective mirrors 20A and 20B disposed outside the first and second image reproduction units 4 and 6, and a third reflective mirror 20C disposed in the second image reproduction unit 6. The half mirror 20' is disposed and inclined in the light shield 22 in the same way as the first reflector 20 of the first embodiment. This half mirror 20' is known in the art to have both reflective and light transmissive properties. Namely, referring to FIG. 9, it is seen that, when projected from the projector 14 as indicated by the dotted line R1to the half mirror 20', the first image 24 is reflected by the half mirror 20' downwardly to the first screen 12 as indicated by the dotted line R2, while being simultaneously transmitted through that half mirror 20' as indicated by the dotted line R3. As a result, the reflected portion of the first image 24, which has been reflected by the half mirror 20', is projected to the first screen 12 as indicated by the dotted line R2and indicated thereon. On the other hand, the transmitted portion of the first image 24, which has been transmitted through the half mirror 20', is reflected by the first reflective mirror 20A donwardly toward the second reflective mirror 20B as indicated by the dotted line R4, and then, the image 24 is in turn reflected by that second reflective mirror 20B in a direction to the third reflective mirror 20C as indicated by the dotted line R5. Finally, reflected by that third reflective mirror 20C, the image 24 is projected to and indicated on the second screen 16. Consequently, a same image 24 is indicated on both first and second screens 12 and 16, whereupon the image 24 projected from the first screen 12 is reflected by the second screen 16 to form one reflected image 26 on that particular second screen 16, while another image 24 substantially identical to the reflected image 26 is indicated on the second screen 16, although, as shown, a certain difference can be found in size between the two images 24 and 26. As far as the FIG. 9 is concerned, a whole image indicated from the second screen 16 is viewed in the eyes of observer as if a three-dimensional image of world map at 26 was floated inwardly of the second screen 16, while another same world map image 24 is viewed as if it was situated outwardly of the image 26 or surrounded the same.

FIG. 10 shows a fifth alternative embodiment wherein each of the first and second image reproduction units 4 and 6 is a liquid crystal display device or the like, as generally designated by 19. It may of course be an organic EL display device (i.e. an organic electroluminescent display device). In this embodiment, as shown, the image reproduction and indication surfaces 8 and 10 respectively of the first and second image reproduction units 4 and 6 are each embodied by an integral screen 19a of the liquid crystal display device 19 (or the organic EL display device). If the outer surface of that screen 19a is low in reflectivity, it is preferred to treat or process it so as to have a certain reflectivity. The liquid crystal display device or the organic EL display device (19) may be an ordinary one available on market, or may be a specially designed display device for the purposed of the present invention. The illustrated screens 19a are each of semispherical shape, but they are not limitative. Of course, while not shown, the display devices 19 include an image output device for outputting and sending imagery or image data thereto. In this particular embodiment also, it may be so arranged that a plurality of the second display devices 19 (corresponding to the second image reproduction unit 6) are provided with respect to one first display device 19 (corresponding to the first image reproduction unit 4).

FIG. 11 shows a sixth alternative embodiment which is identical structurally to the first embodiment, except that the first screen 12 (i.e. the image reproduction surface 8) is disposed such that the concave inner surface side 12b thereof is in an opposedly facing relation with the convex outer surface side 16a of the second screen 16.

Figure 12:
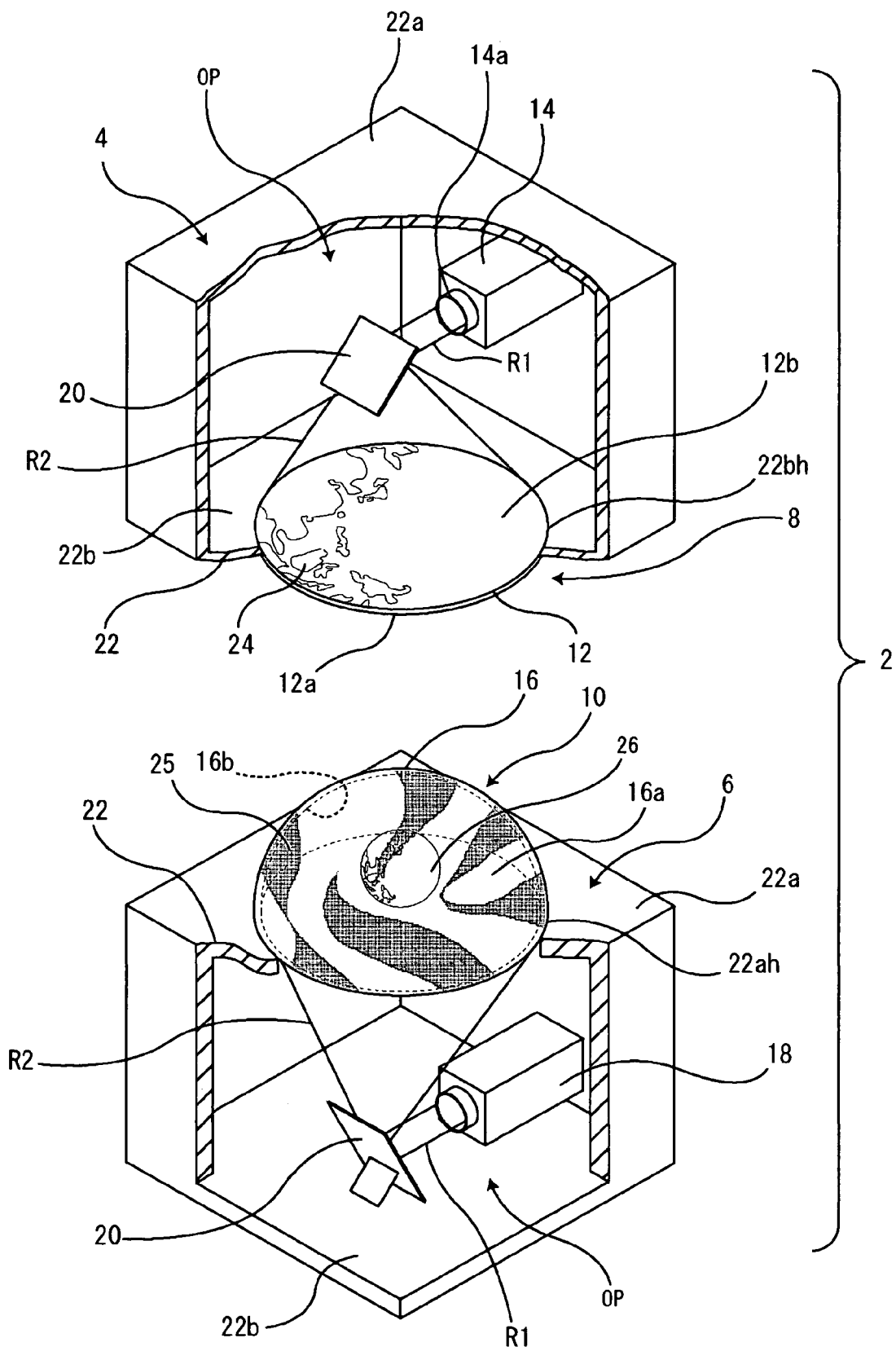
FIG. 12 is a partly broken schematic perspective view showing a seventh alternative embodiment of three-dimensional display device.

FIG. 12, shows a seventh alternative embodiment which is identical structurally to the first embodiment, except that only the first screen 12 (i.e. the image reproduction surface 8) is formed flat.

In all of the foregoing embodiments shown in FIGS. 10 to 12, it is to be seen that a reflected three-dimensional image 26 is viewed from the second screen 16 by the eyes of observer in substantially the same way as described in the first embodiment, which is also based on the basic optical description stated previously with reference to FIG. 13. In some cases, the shape of the three-dimensionally reflected image 26 may slightly vary according to the shape of the first and second screens 12 and 16, but it does not create any prominent change in the shape of the image 26 among all the embodiments.

While having described the present invention thus far, it should be understood that the invention is not limited to the illustrated embodiment, but any other modification, replacement, and addition may be applied thereto without departing from the scopes of the appended claims. For example, the second image reproduction unit 6 may be disposed above the first image reproduction unit 4, or, in contrast to the illustrated vertical disposition, both first and second image reproduction units 4 and 6 be disposed in a horizontally and mutually facing state, with the central axes thereof extending along a horizontal line. In any case, the first and second image reproduction units 4 and 6 may be arranged in any required manner according to direction and angle at which an observer (34) watches the image indication surface 10 (or the second screen 16). In most of the illustrated arrangements, it can be observed that the central axis of the first image reproduction unit 4 is aligned with that of the second image reproduction unit 6, but, it may be so arranged that the central axis of the latter 4 intersects or parallels that of the former 6, or vice versa, so as to adequately vary angular relation therebetween. Further, as required, the second image reproduction unit 6 may be inoperative to indicate no second image 25, while only the first image reproduction unit 4 be operative to indicate the first image 24, so that the first image 24 is reflected by the second screen 16 to only form a three-dimensional image 26 thereon.

In accordance with the present invention, it is to be appreciated that the first and second images 24 and 25 are indicated from their respective first and second screens 12 and 16, and one of the two images 24 and 25 is reflected by one of the two screens 12 and 16, so that a reflected image 26 is viewed in the eyes of person looking thereat as if it was a three-dimensional image, which is due to the parallax discussed previously. Hence, the three-dimensional display device 2 allows its multipurpose uses in a variety of industrial fields. For instance, it is possible to indicate the three-dimensional image 26 and second image 25 in a translunary or fantastic way, thus allowing its use for a consolatory or soothing effect, a mood-stabilizing or tranquilizing effect, and so forth. This kind of mood-stabilizing effect is enhanced by adding a music or aroma thereto, so that the present display device 2 can be used as a medical aid for psychological or tranquilizing treatment. Further, as opposed to a normal two-dimensional image reproduction device, such as a television set, the three-dimensional display device 2 effectively allows the images 25, 26 to be presented in an intricate way to display a variety of artistic images, which can therefore be used as an object d'art or artifact, in such places as hospital, hotel, art museum, anteroom, lobby, or the like.

What is claimed is:

1. A device for displaying imagery three-dimensionally on a spherical surface, comprising:
   a first spherical image reproduction surface capable of reproducing an image from a first projector and indicating a first imagery, said first image reproduction surface including an image reproduction surface for allowing said first imagery to be indicated thereon; and
   a second spherical image reproduction surface capable of reproducing an image from a second projector and indicating a second imagery, said second image reproduction sphere having an image indication surface for allowing said second imagery to be indicated thereon;
   wherein said first and second image reproduction surfaces are arranged such that said image reproduction surface of said first image reproduction surface is an opposedly facing relation with said image indication surface of said second image reproduction surface,
   and wherein said image indication surface of said second image reproduction surface includes a reflective surface for reflecting said first imagery from said first image reproduction surface,
   wherein a three dimensional image is displayed on said second image reproduction spherical surface.

2. The device as claimed in claim 1, wherein said first spherical image reproduction surface is curved so as to have a convex surface side, whereas said second spherical image indication surface is also curved so as to have a convex surface side, and wherein said convex surface sides respectively of said image reproduction and indication surfaces are in an opposedly facing relation with each other.

3. The device as claimed in claim 1, wherein said image reproduction surface is curved so as to have a convex surface side and a concave surface side, whereas said image indication surface is also curved and has a convex surface side and a concave surface side, and wherein said convex surface side of said image reproduction surface is in an opposedly facing relation with said concave surface side of said image indication surface.

4. The device as claimed in claim 1, wherein said image reproduction surface is formed flat, and said image indication surface is curved.

5. The device as claimed in claim 1, wherein said image reproduction surface includes a non-reflective surface portion capable of preventing said second imagery from being reflected thereby.

6. The device as claimed in claim 1, wherein said first and second image reproduction surface each comprises one selected from the group consisting of a liquid crystal display device and an organic EL display device.

7. The device as claimed in claim 1, wherein said image reproduction surface is disposed at a point above said image indication surface.

8. The device as claimed in claim 1, which further comprises a light shielding means provided about a periphery of said image reproduction surface.

9. The device as claimed in claim 1, wherein said image reproduction surface and said indication surface are each of a semispherical shape.

10. The device as claimed in claim 1, wherein one of said image reproduction and indication surfaces is of a semispherical shape.

11. The device as claimed in claim 1, wherein said second image reproduction surface includes a plurality of said image indication surfaces with respect to said image reproduction surface of said first image reproduction surface.

12. The device as claimed in claim 1, wherein said first image reproduction surface includes a plurality of said image reproduction surfaces with respect to a plurality of said image indication surfaces of said second image surface.

13. The device as claimed in claim 1, wherein a first image reproduction apparatus comprises: a first screen of a light-transmissive type which forms said image reproduction surface; and a first projector for projecting said first imagery to said first screen, wherein a second image reproduction apparatus comprises: a second screen of a light-transmissive type which forms said image indication surface; and a second projector for projecting said second imagery to said second screen, and wherein said second screen includes a surface so formed as to diffusely reflect said second imagery projected from said second projector.

14. The device as claimed in claim 13, wherin said first screen is curved so as to have a convex surface side whereas said second screen is also curved so as to have a convex surface side, and wherein said convex surface sides respectively of said first and second screen are in an opposedly facing relation with each other.

15. The device as claimed in claim 13, wherein said first screen is curved so as to have a convex surface side and a concave surface side, whereas said second screen is also curved so as to have a convex surface side and a concave surface side, and wherein said convex surface side of said first screen is in an opposedly facing relation with said concave surface side of said first ocean.

16. The device as claimed in claim 13, wherein said first screen is formed flat, whereas said second screen is curved so as to have a convex surface side, and wherein the thus-flat-formed first screen is in a opposedly facing relationship with said convex surface side of said second screen.

17. The device as clamed in claim 13, wherein said first screen includes a non-reflective surface capable of preventing said second imagery from being reflected thereby.

18. The device as claimed in claim 13, wherein said first and second projector each includes a fish-eye lens provided therein.

19. The device as claimed in claim 13, wherein one of said first and second projectors includes a fish-eye lens provided therein.

20. The device as claimed in claim 1, which includes a projector arranged such that one image is projected from the projector to each of said image reproduction surface and said image indication surface.

* * * * *